(12) United States Patent
Huang

(10) Patent No.: US 6,588,913 B1
(45) Date of Patent: Jul. 8, 2003

(54) FLASHING LIGHT-EMITTING DEVICE WITH A WIND GENERATOR

(76) Inventor: Kuo-Lin Huang, No. 85, Suan-Tou, Suan-Tou Tsun, Liu-Chiao Hsiang, Chia-I Hsien (TW)

(*) Notice: Subject to any disclaimer, the term of this patent is extended or adjusted under 35 U.S.C. 154(b) by 0 days.

(21) Appl. No.: 10/084,872

(22) Filed: Feb. 28, 2002

(51) Int. Cl.[7] ................................................ F21V 33/00
(52) U.S. Cl. ........................ 362/96; 362/35; 362/192; 362/474; 362/473; 416/5
(58) Field of Search ............................ 362/96, 35, 192, 362/431, 800, 473, 474, 475, 476, 227, 228, 253, 286, 385, 458; 416/5

(56) References Cited

U.S. PATENT DOCUMENTS

| | | | | |
|---|---|---|---|---|
| 3,974,369 A | * | 8/1976 | Chmela et al. | ............. 362/190 |
| 4,309,741 A | * | 1/1982 | Smith | ......................... 362/473 |
| 6,386,731 B1 | * | 5/2002 | Cheng | .......................... 362/192 |
| 6,398,381 B1 | * | 6/2002 | Tseng | ............................ 362/96 |

* cited by examiner

Primary Examiner—Sandra O'Shea
Assistant Examiner—Ronald E. DelGizzi
(74) Attorney, Agent, or Firm—Ladas & Parry

(57) ABSTRACT

A flashing light-emitting device includes a rotating member, which is mounted rotatably within a hollow base and which has a plurality of fixed vane elements that can be rotated by air current created when the base moves. A coil unit is wound on a sheave, which is rotatable with the rotating member. Two electrically and magnetically conducting rings are fixed to the sheave, and are formed integrally with a plurality of tongues that are aligned and staggered circumferentially and that extend into the sheave. The coil unit is in electrical connection with the conducting rings and a plurality of light-emitting elements. When the rotating member rotates within the base, the coil unit rotates about a permanent magnet fixed in the base so that electricity is generated on the coil unit. As such, the light-emitting elements can emit a flashing light.

7 Claims, 6 Drawing Sheets

FLASHING LIGHT-EMITTING DEVICE WITH A WIND GENERATOR

BACKGROUND OF THE INVENTION

1. Field of the Invention

This invention relates to a flashing light-emitting device, and more particularly to a flashing light-emitting device, which includes a wind generator that can convert mechanical energy to electrical energy for energizing a plurality of light-emitting elements.

2. Description of the Related Art

To enhance the safety of riders, a wheeled transport device, e.g., a bicycle or a scooter, is equipped with a light-reflecting device, such as a reflector or a light-reflecting adhesive paper. However, such a light-reflecting device can generate an alerting light only when light is emitted thereon, thereby affecting utility of the device. A light-generating device has been proposed heretofore to solve this problem by using a light emitting diode that serves as a light source. The light emitting diode requires a battery unit to supply electrical power. The light-generating device suffers from a drawback in that it is necessary to replace the battery unit, thereby resulting in environmental pollution and increased costs.

SUMMARY OF THE INVENTION

The object of this invention is to provide a flashing light-emitting device, which includes a wind generator that can convert mechanical energy to electrical energy for energizing a plurality of light-emitting elements and that does not require replacement of any power source.

According to this invention, a flashing light-emitting device includes a rotating member, which is mounted rotatably within a hollow base and which has a plurality of fixed vane elements that can be rotated by air current created when the base moves. A coil unit is wound on a sheave, which is rotatable with the rotating member. Two electrically and magnetically conducting rings are fixed to the sheave, and are formed integrally with a plurality of tongues that are aligned and staggered circumferentially and that extend into the sheave. The coil unit is in electrical connection with the conducting rings and a plurality of light-emitting elements. When the rotating member rotates within the base, the coil unit rotates about a permanent magnet fixed in the base so that electricity is generated on the coil unit. As such, the light-emitting elements can emit a flashing light. The permanent magnet, the sheave, the coil unit, and the rings constitute cooperatively a wind generator.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
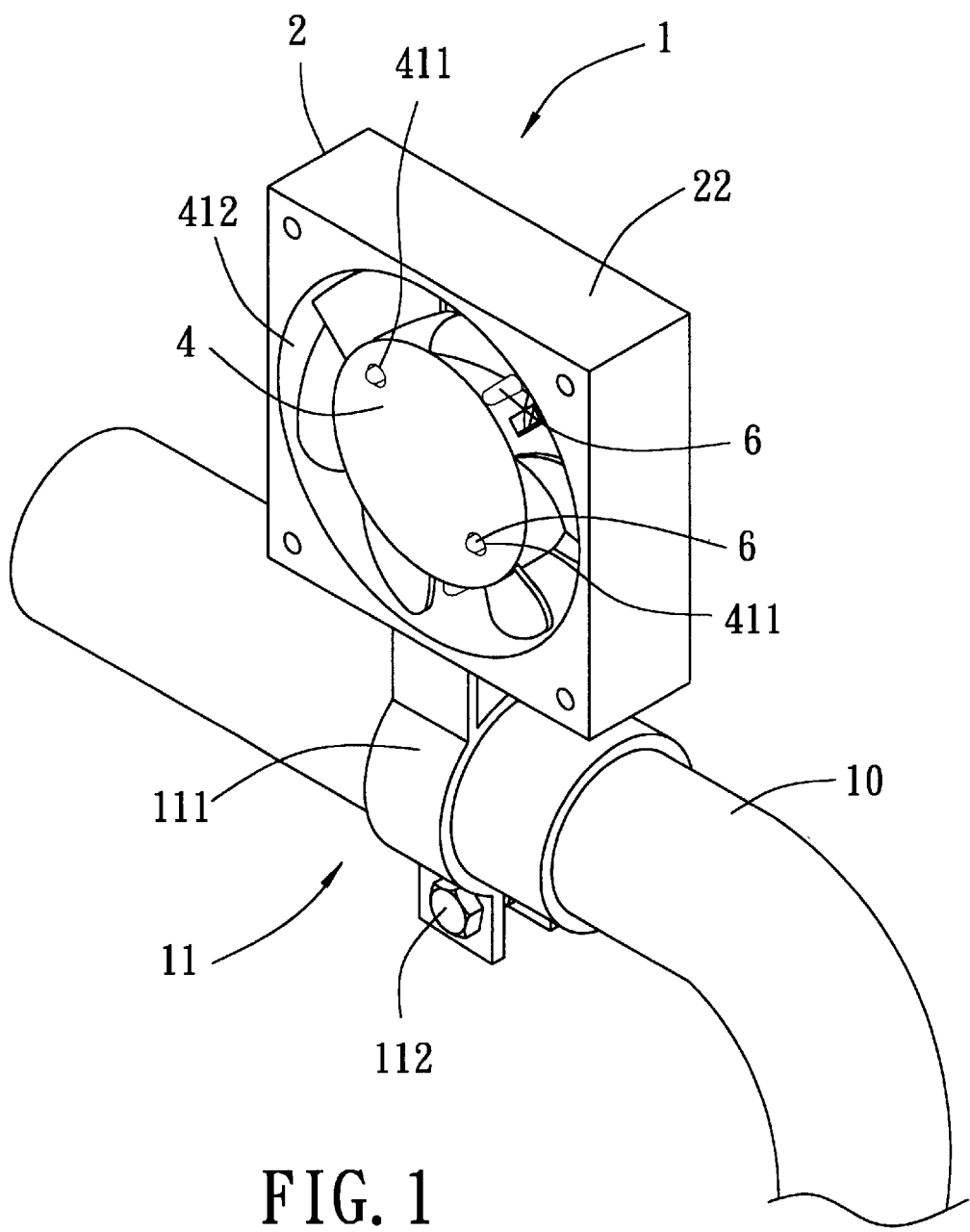
FIG. 1 is an assembled perspective view showing the preferred embodiment of a flashing light-emitting device according to this invention, which is mounted fixedly on a handle of a bicycle.

Referring to FIGS. 1 to 6, the preferred embodiment of a flashing light-emitting device 1 according to this invention is shown to include a hollow base 2, an annular permanent magnet 3, a rotating member 4, a current-generating assembly 5, four front light-emitting elements 6, a plurality of rear light-emitting elements 6', a C-shaped front retaining ring 7, and a C-shaped rear retaining ring 7'.

The base 2 is connected fixedly to a moving object, such as a handle 10 of a bicycle, by a holder unit 11, which consists of a C-shaped clamp 111 and a lock bolt 112 for interconnecting two ends of the clamp 111, as shown in FIG. 1. The base 2 has a generally vertical disk 21, a surrounding wall 22, a horizontal support shaft 23, a bearing unit 24, and four radially extending rods 25 (see FIG. 2). Each of the rods 25 is secured to the surrounding wall 22 at an outer end and to the disk 21 at an inner end so as to define four openings 211, each of which is formed between an adjacent pair of the rods 25 and between the disk 21 and the surrounding wall 22. The openings 211 constitute a rear end opening unit. The support shaft 23 has a thick rear shaft portion 231 and a thin front shaft portion 232 that has an elliptical cross-section and that extends integrally and forwardly from a front end surface of the rear shaft portion 231 so as to define a shoulder 233 therebetween.

The permanent magnet 3 includes a rear side surface 31 that abuts against the shoulder 233 of the support shaft 23, a front side surface 32, and a central hole 33 that has an elliptical cross-section and that engages fittingly the front shaft portion 232 of the support shaft 23 so as to prevent rotation of the permanent magnet 3 relative to the support shaft 23. The front retaining ring 7 is sleeved on the front shaft portion 232 of the support shaft 23 so as to confine the permanent magnet 3 between the shoulder 233 and the front retaining ring 7.

The rotating member 4 has a hollow cylindrical body, which includes a front end wall 41 that is formed with two holes 411 (see FIG. 1) therethrough and that defines an annular space 412 (see FIG. 1) between the front end wall 41 and the surrounding wall 22 of the base 2, a surrounding wall 42 that extends integrally and rearwardly from an outer periphery of the front end wall 41 and that is formed with a plurality of angularly spaced-apart apertures 45 therethrough, and a horizontal rotating shaft 43 that extends integrally and rearwardly from the center of the front end wall 41 and that extends through an axially extending bearing hole 234 in the support shaft 23. The bearing 24 is disposed between the support shaft 23 and the rotating shaft 43 so as to permit rotation of the rotating shaft 43 within the support shaft 23. A bushing 235 is disposed within the bearing hole 234, and is sleeved on the rotating shaft 43. The rear retaining ring 7' is sleeved on a rear end 431 of the rotating shaft 43, and engages an annular groove 431 in the rear end 431 so as to confine the support shaft 23 between the front end wall 41 of the rotating member 4 and the rear retaining ring 7'. The rotating member 4 further has a plurality of vane elements 44 that extend integrally from an outer surface of the surrounding wall 42. Because the vane elements 44 are exposed within the annular space 412, when the bicycle moves forward, an air current is formed in front of the base 2, thereby rotating the vane elements 44 within the base 2.

Figure 2:
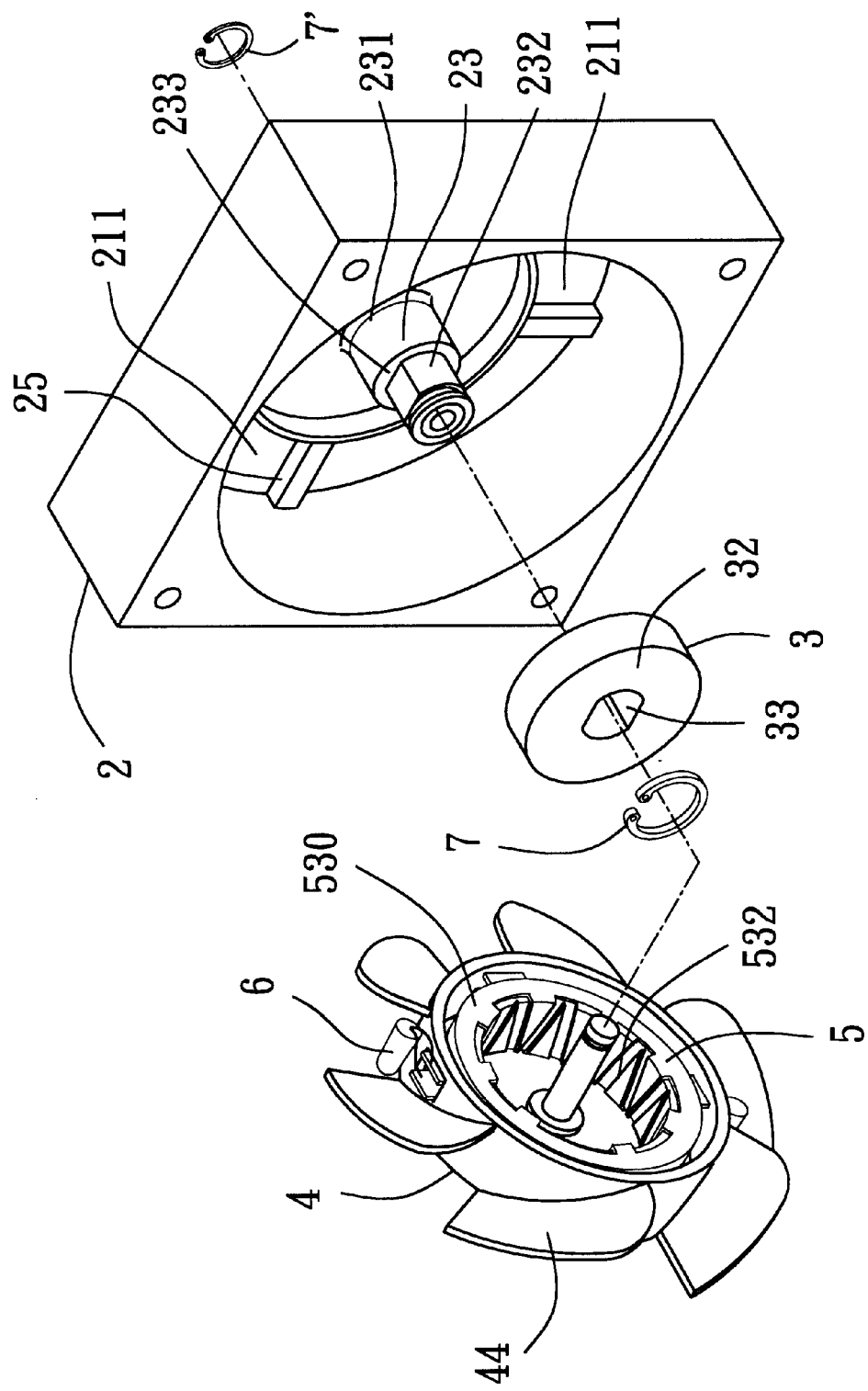
FIG. 2 is a partly exploded perspective view of the preferred embodiment.
Figure 3:
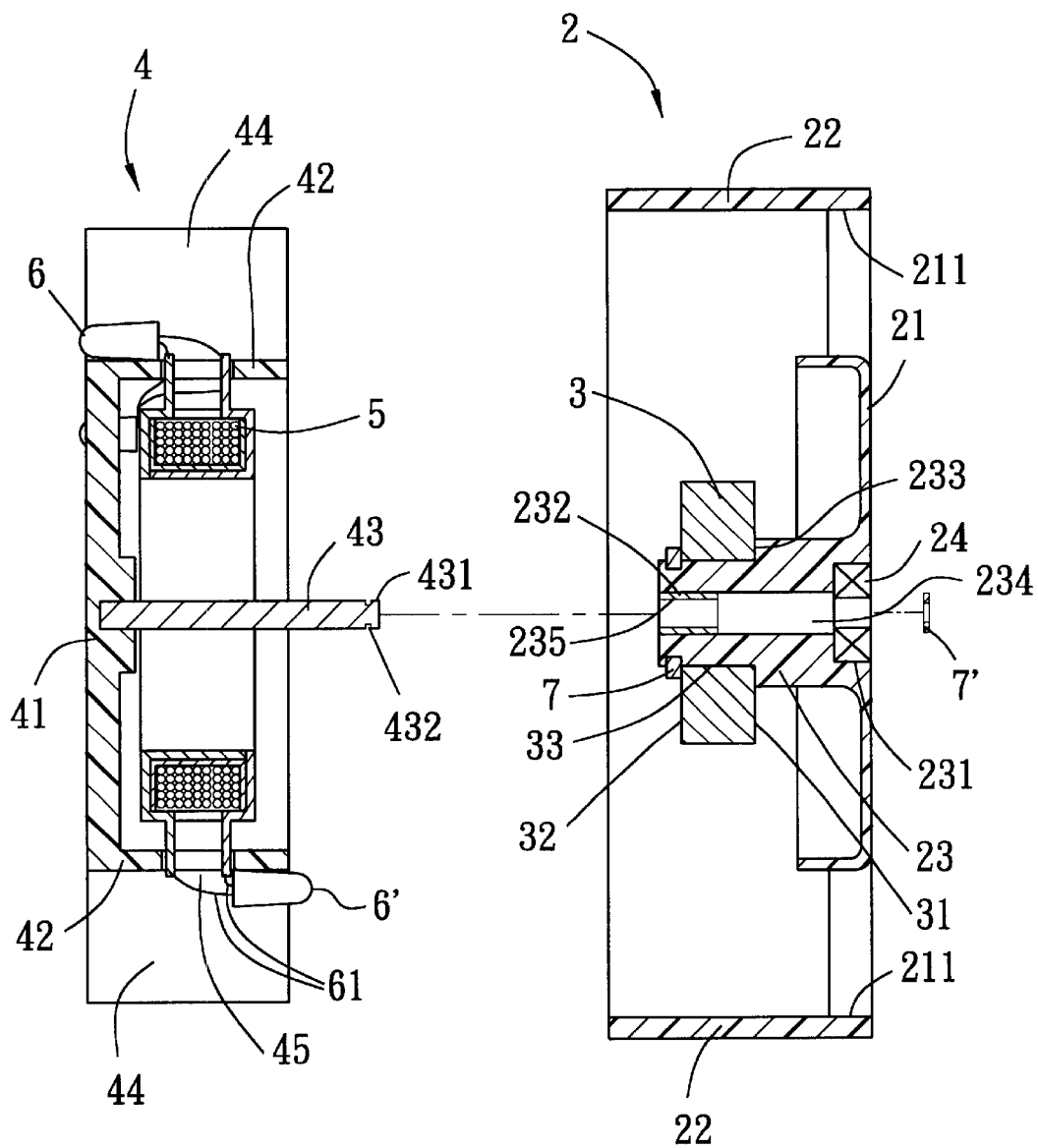
FIG. 3 is a partly exploded sectional view of the preferred embodiment.
Figure 4:
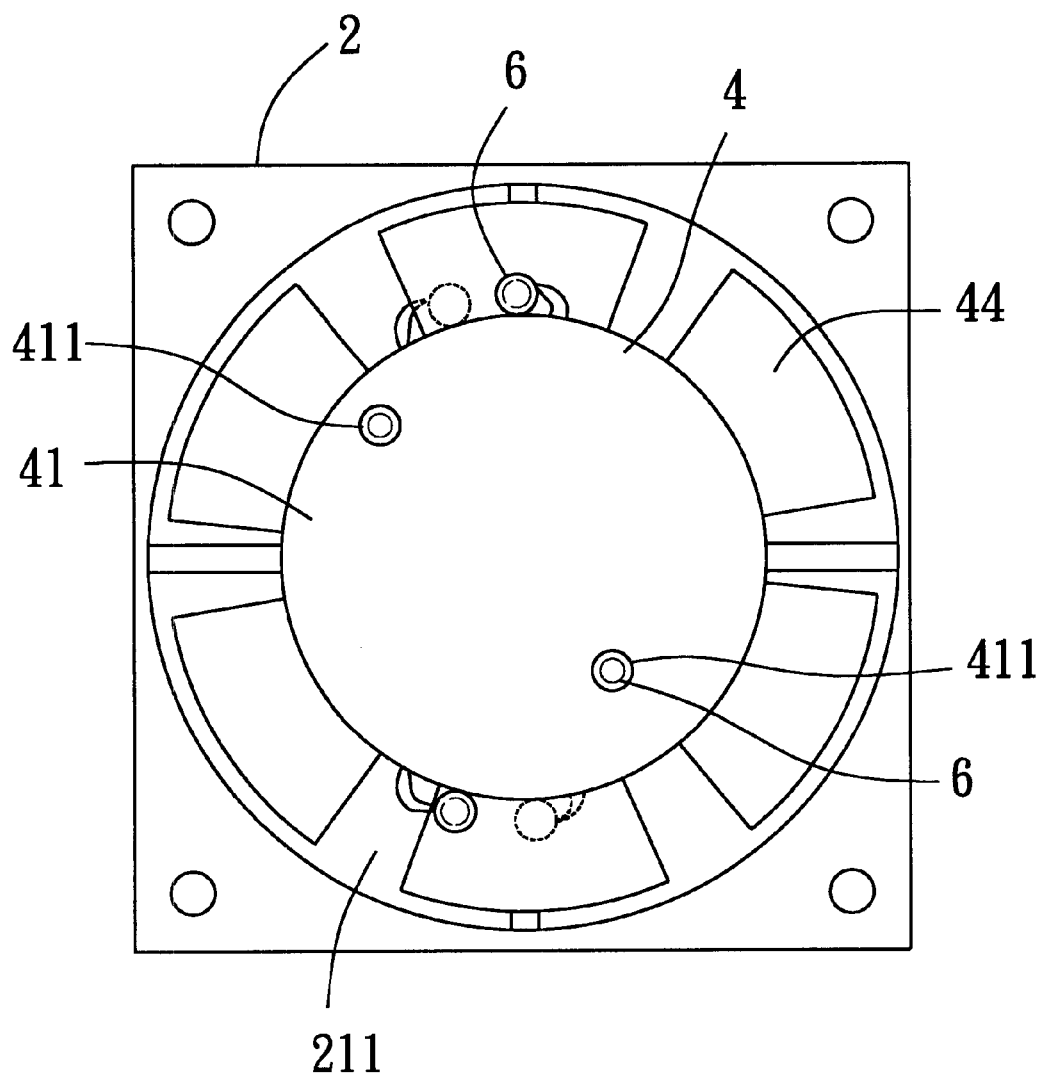
FIG. 4 is a schematic front view of the preferred embodiment.
Figure 5:
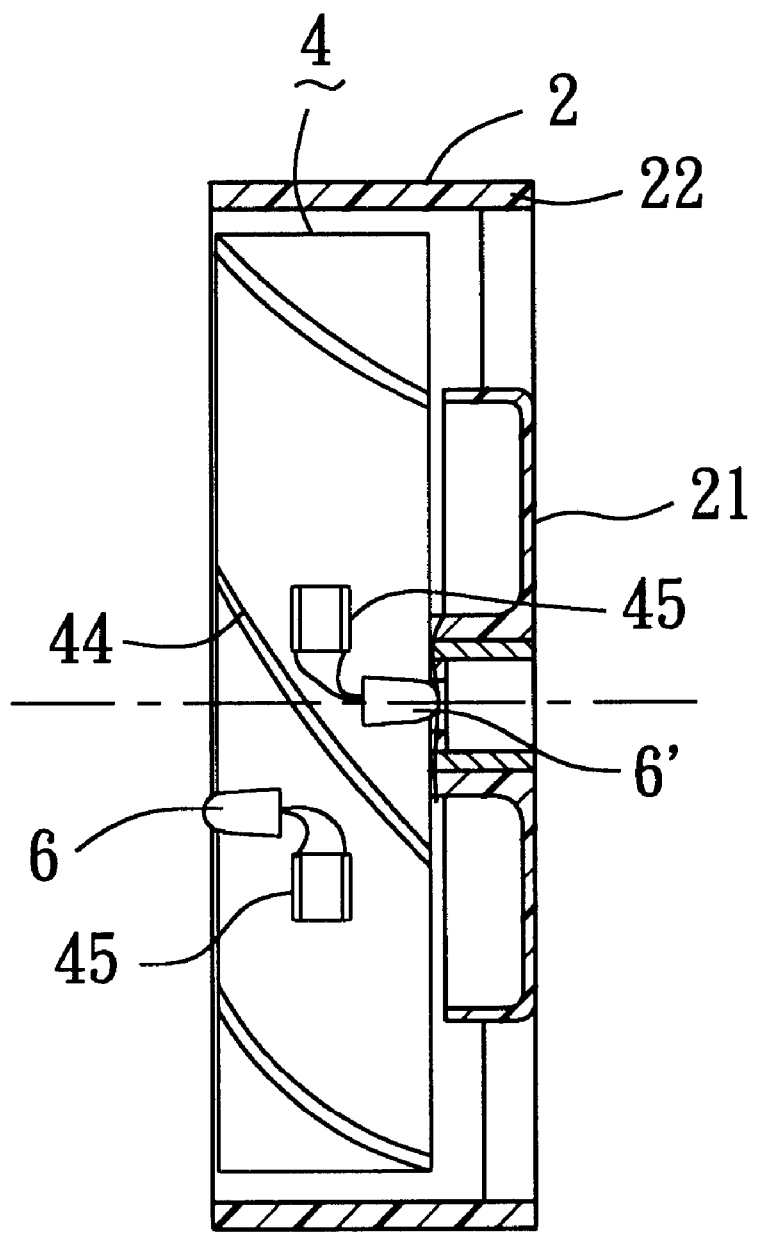
FIG. 5 is a partly sectional view of the preferred embodiment.
Figure 6:
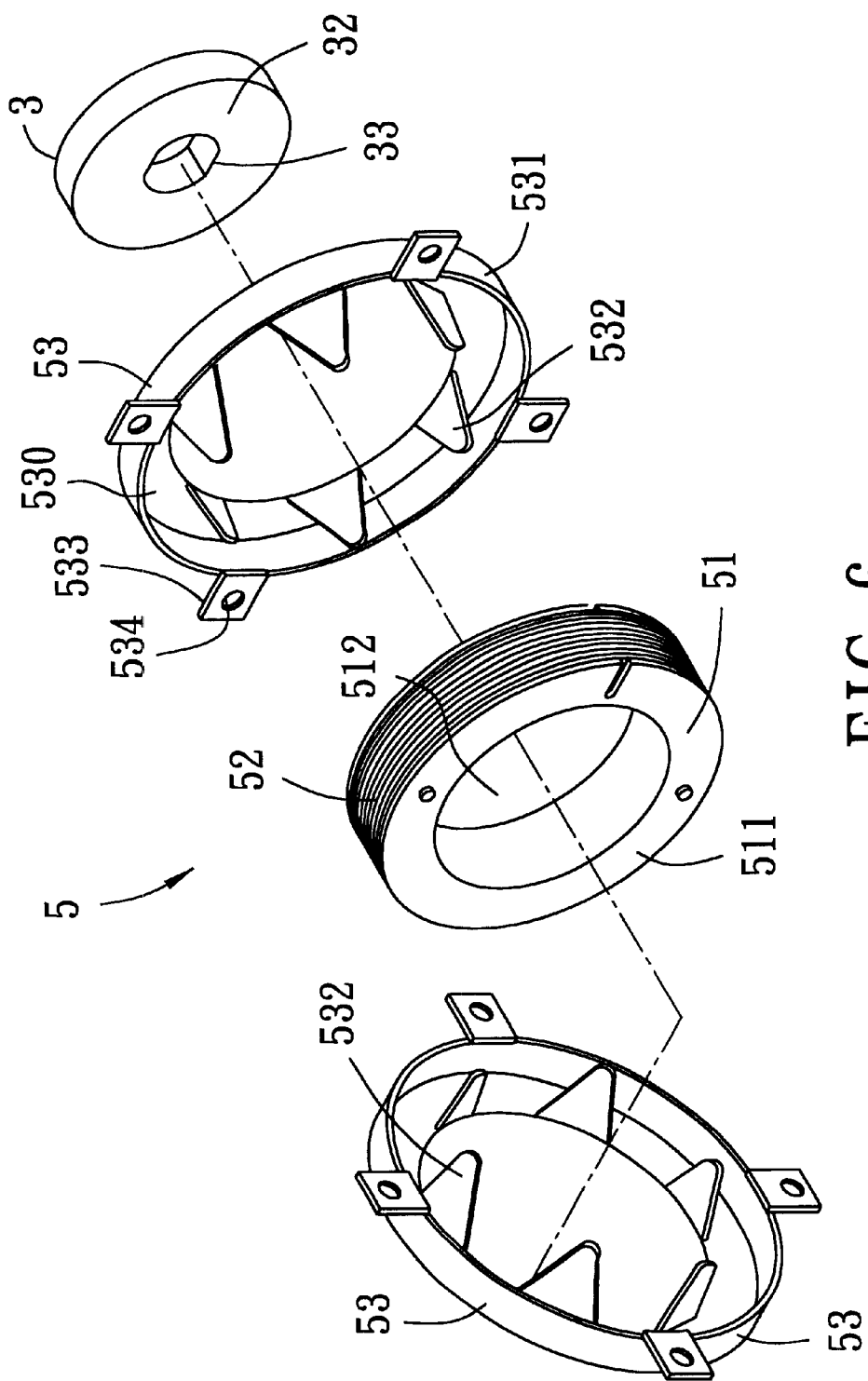
FIG. 6 is a partly exploded perspective view showing a wind generator of the preferred embodiment.

The current-generating assembly 5 includes a sheave 51 that is disposed rotatably around the permanent magnet 3, a coil unit 52 that is wound on the sheave 51, and two electrically and magnetically conducting rings 53 that flank the sheave 51. Each of the conducting rings 53 has a vertical ringplate 530 that abuts against aside surface 511 of the sheave 51, a hoop 531 that extends axially from an outer periphery of the ringplate 530 and that is sleeved on the sheave 51, and a plurality of integral tongues 532 that extend axially from an inner periphery of the ring plate 530 and into a central hole 512 in the sheave 51 and that are spaced apart from one another along a circumferential direction of the conducting rings 53. The tongues 532 of the conducting rings 53 are aligned and staggered along the circumferential direction of the conducting rings 53, as shown in FIG. 2. Each of the conducting rings 53 further has four lugs 533 that extend integrally, radially, and outwardly from the hoop 531 and that extend through the corresponding aperture 45 in the rotating member 4, as shown in FIG. 3, thereby permitting synchronous rotation of the current-generating assembly 5 and the rotating member 4. Accordingly, the sheave 51 is clamped and fixed between the conducting rings 5, and is fixed relative to the rotating member 4. Four plastic bolts (not shown) can extend through holes 534 in the lugs 533 so as to interconnect the conducting rings 53 fixedly.

The front and rear light-emitting elements 6, 6' are constructed as light emitting diodes.

Two of the front light-emitting elements 6 are adhered to front ends of the outer surface of the surrounding wall 42 of the rotating member 4, and are exposed within the annular space 412. Another two of the front light-emitting elements 6 extend through and are press-fitted within the holes 411 in the front end wall 41 of the rotating member 4.

The rear light-emitting elements 6' are adhered to rear ends of the outer surface of the surrounding wall 42 of the rotating member 4, and are exposed within the openings 211 in the rear end of the base 2. Each of the front and rear light-emitting elements 6, 6' is disposed adjacent to one of the apertures 45.

The coil unit 52 has two ends (not shown) that are in electrical connection with the conducting rings 53, respectively. Each of the front and rear light-emitting elements 6, 6' is in electrical connection with the conducting rings 53 via two electrical wires 61, respectively.

When the rotating member 4 rotates within the base 2, electricity is generated on the coil unit 52 so as to intermittently light up the front and rear light-emitting elements 6, 6', thereby emitting a flashing light from both a front end opening unit that includes the holes 411 and the annular space 412, and the rear end opening that includes the openings 211.

With this invention thus explained, it is apparent that numerous modifications and variations can be made without departing from the scope and spirit of this invention.

It is therefore intended that this invention be limited only as indicated in the appended claims.

I claim:

1. A flashing light-emitting device comprising:
   a hollow base having a fixed horizontal support shaft, a front end opening unit, and a rear end opening unit, said base being adapted to be attached to a moving object that is movable in a forward direction;
   an annular permanent magnet sleeved non-rotatably on said support shaft and disposed in said base;
   a rotating member disposed rotatably within said base and having a front end, a rear end, and a plurality of fixed vane elements that are rotatable about said support shaft and that are adapted to be driven by air current created when said base moves forward;
   a sheave mounted fixedly on said rotating member and disposed around said permanent magnet, said sheave defining a central hole therein;
   a coil unit wound on said sheave;
   two electrically and magnetically conducting rings connected respectively and fixedly to two opposite sides of said sheave and in electrical connection with said coil unit, each of said conducting rings having a plurality of integral tongues that extend into said central hole in said sheave in an axial direction of said conducting rings and that are spaced apart from one another along a circumferential direction of said conducting rings, said tongues of said conducting rings being aligned and staggered along the circumferential direction of said conducting rings;
   a plurality of spaced-apart front light-emitting elements attached to said front end of said rotating member and in electrical connection with said coil unit via said conducting rings; and
   a plurality of spaced-apart rear light-emitting elements attached to said rear end of said rotating member and in electrical connection with said coil unit via said conducting rings, forward movement of said base resulting in rotation of said rotating member within said base such that electricity is generated on said coil unit so as to intermittently light up said front and rear light-emitting elements, thereby emitting a flashing light from said front and rear end opening units.

2. The flashing light-emitting device as claimed in claim 1, wherein said base includes a surrounding wall that has a front end and a rear end, a generally vertical disk that is disposed in said surrounding wall, and a plurality of radially extending rods that have an outer end secured to said surrounding wall, and an inner end secured to said disk so as to define a plurality of openings, each of which is formed between an adjacent pair of said rods and between said surrounding wall and said disk, said openings constituting said rear end opening unit in said base, said rear light-emitting elements being rotatable with said rotating member within said base and being exposed within said openings, thereby emitting light rearward from said base via said openings.

3. The flashing light-emitting device as claimed in claim 1, wherein said support shaft has a thick rear shaft portion with a front end surface, and a thin front shaft portion that has an elliptical cross-section and that extends integrally and forwardly from said front end surface of said rear shaft portion so as to define a shoulder therebetween, said permanent magnet abutting against said shoulder and being formed with a central hole that has an elliptical cross-section and that engages fittingly said front shaft portion of said support shaft so as to prevent rotation of said permanent magnet relative to said support shaft, said flashing light-emitting device further including a C-shaped front retaining ring that is sleeved on said front shaft portion so as to confine said permanent magnet between said shoulder and said front retaining ring.

4. The flashing light-emitting device as claimed in claim 1, wherein said support shaft has a front end surface that is formed with an axially extending bearing hole, said rotating member further having a hollow cylindrical body, which includes a front end wall, a surrounding wall that extends integrally and rearwardly from an outer periphery of said front end wall, and a horizontal rotating shaft that extends integrally and rearwardly from a center of said front end wall and that is journalled within said bearing hole in said support shaft of said base.

5. The flashing light-emitting device as claimed in claim 4, wherein said bearing hole is formed through said shaft, said rotating shaft extending through said bearing hole and having a rear end, said flashing light-emitting device further including a C-shaped rear retaining ring that is sleeved on said rear end of said rotating shaft so as to confine said support shaft between said front end wall of said rotating member and said rear retaining ring.

6. The flashing light-emitting device as claimed in claim 4, wherein said surrounding wall of said rotating member has an outer surface, and a plurality of apertures formed therethrough, each of said front and rear light-emitting elements being attached to said outer surface of said surrounding wall of said rotating member and being disposed adjacent to one of said apertures, said vane elements extending integrally from said outer surface of said surrounding wall of said rotating member, said conducting rings being disposed within said surrounding wall of said rotating member, each of said front and rear light-emitting elements being provided with an adjacent pair of electrical wires, each of which is in electrical connection with a respective one of said conducting rings.

7. The flashing light-emitting device as claimed in claim 6, wherein said sheave has two opposite side surfaces, each of said conducting rings further having a vertical ring plate that is connected fixedly to said surrounding wall of said rotating member and that abuts against a respective one of said side surfaces of said sheave, said ring plates having inner peripheries, from which said tongues extend integrally.

* * * * *